United States Patent [19]

Miller et al.

[11] Patent Number: 5,492,419
[45] Date of Patent: Feb. 20, 1996

[54] CARTRIDGE AXLE PINION BEARING ASSEMBLY

[75] Inventors: John R. Miller, Jackson; Robert W. Frayer, Jr., Gregory, both of Mich.

[73] Assignee: NTN Corporation, Osaka, Japan

[21] Appl. No.: 276,646

[22] Filed: Jul. 19, 1994

[51] Int. Cl.⁶ .............................. F16C 33/72; F16C 43/24
[52] U.S. Cl. ........................ 384/551; 384/477; 384/489; 384/584
[58] Field of Search ....................... 384/477, 489, 384/551, 560, 564, 569, 570, 571, 504, 506, 484; 74/467

[56] References Cited

U.S. PATENT DOCUMENTS

| | | |
|---|---|---|
| 2,059,181 | 10/1936 | Wilson . |
| 2,420,820 | 5/1947 | Eastburg . |
| 2,447,928 | 8/1948 | Bergstrom . |
| 4,304,446 | 12/1981 | Goodine . |
| 4,309,916 | 1/1982 | Ohkuma et al. .............. 74/467 |
| 4,336,971 | 6/1982 | Reiter . |
| 4,427,242 | 1/1984 | Otto . |
| 4,615,627 | 10/1986 | Schilling et al. ............ 384/551 |
| 4,692,040 | 9/1987 | Ebaugh et al. .............. 384/484 |
| 4,702,626 | 10/1987 | Scholl et al. ............... 384/489 |
| 4,824,264 | 4/1989 | Hoebel ..................... 384/473 |
| 4,997,294 | 3/1991 | Hillmann ................. 384/477 X |
| 5,009,523 | 4/1991 | Folger et al. ............. 384/475 |
| 5,017,025 | 5/1991 | Williams .................. 384/584 |
| 5,037,214 | 8/1991 | Dougherty ................ 384/571 |
| 5,053,661 | 10/1991 | Kitamura et al. ........ 74/467 X |
| 5,118,206 | 6/1992 | Otto et al. ............... 384/477 |
| 5,121,998 | 6/1992 | Bhatia ...................... 384/448 |

FOREIGN PATENT DOCUMENTS

| | | | |
|---|---|---|---|
| 4222852 | 1/1994 | Germany ................. 384/477 |
| 1350995 | 4/1974 | United Kingdom . | |

*Primary Examiner*—Thomas R. Hannon
*Attorney, Agent, or Firm*—Harness, Dickey & Pierce

[57] ABSTRACT

A self lubricated and sealed pinion cartridge bearing assembly for use with a gear reduction system which may be used for example for providing rotating shaft support for a pinion shaft of a motor vehicle drive axle. The bearing assembly has a pair of anti-friction bearings having an outer and inner race and a plurality of circumferentially spaced apart rolling elements which roll along inner and outer raceways. A spacer is provided between the bearing inner races, and at least one seal is formed between the inner races and the spacer to circumferentially seal the inner races together. A pair of seals are further provided between the inner and outer races of each bearing at each outboard face to form barriers at the ends of the bearing assembly for retaining lubricating oil within the bearing assembly.

26 Claims, 4 Drawing Sheets

CARTRIDGE AXLE PINION BEARING ASSEMBLY

This invention relates to improvements in the bearing support system for gear type power transmission systems and more particularly to a sealed self-lubricated bearing unit.

Rolling element bearings are used at the ends of axles and other shafts, for example for supporting a pinion gear shaft of a differential for heavy duty trucks and vehicles. Due to large gear reductions and high loads and torques acting on such pinion gear shafts, bearings for pinion shaft support operate under severe conditions.

Standard axle pinion shaft bearings are splash-lubricated from sump oil in an axle assembly. However, sump oil which is present to lubricate the axle gears typically contains extreme pressure ('EP') additives which have been shown to cause a decrease in bearing life when used as a rolling element bearing lubricant. Additionally, the ability to splash-lubricate the bearing at low vehicle (or axle) speeds and low temperatures is diminished as the volume of oil thrown by the rotating ring gear is greatly reduced by both factors, thus starving the bearing for lubrication. Further problems are encountered because metallic debris is generated by the axle systems which is carried in the lubricating oil and is further continually passed through the bearing. Since tapered roller bearings typically used in differentials are extremely sensitive to particulate debris, damage is caused by the debris which reduces bearing life.

As an alternative to splash lubricating axle pinion shaft bearings, oil has been pumped through the bearing which improves bearing life, but increases cost and complexity and does nothing to eliminate the problems of 'EP' additives or contaminants.

Another disadvantage of present oil lubricated pinion axle bearing assemblies is the need to provide oil flow passages in the bearing support structure. The presence of such passages can create stress concentrations and thus points of potential failure.

Setting an appropriate "preload" on a tapered roller bearing assembly is also very important in terms of the lifespan and proper operation of the bearing assembly. Preload is the force acting between the rolling elements and the raceways in the absence of external forces. Conventional axle pinion shaft bearings are assembled in multiple pieces into the axle housing; and shimming is required to provide the desired preload. This assembly process is labor intensive and therefore costly, exposes the bearing elements to contamination, and can be a source of quality control problems.

Sealed pinion bearing systems have also been proposed in the past. However, in these systems grease, not oil, is sealed within the bearing unit. Grease lubricated bearings, especially under extreme operating conditions such as found with axle applications do not perform as well as oil lubricated bearings. Grease is formed by combining oil with a "soap" often a clay-type substance. The "soap" in the grease breaks down over time as well as under harsh operating conditions.

In view of the foregoing there remains a need in the industry for an improved pinion shaft bearing which addresses the above mentioned shortcomings of existing designs. In addition an improved bearing for this application must be cost efficient in design, and provide ease of assembly.

SUMMARY OF THE INVENTION

In accordance with this invention, a sealed cartridge type pinion shaft bearing assembly is provided which is oil lubricated. The pinion cartridge bearing assembly of this invention has a multi-piece inner race set with a dimensioned spacer subassembly disposed between a pair of inner races to provide for an assembled bearing sealed with oil which has a desired preload. Outer races combine with the inner races to define raceways of conical configuration to accommodate tapered rolling elements. At least one seal is formed between the inner races. Furthermore, a pair of oil seals are carried at the outboard ends of the inner and outer races to form barriers at the ends of the bearing assembly which prevent lubricating oil contained within the assembled bearing unit from leaking out. Additionally, the oil seals prevent axle pinion lubricant from entering the bearing assembly.

A key feature to the feasibility of this system is the unique approach of sealing between the two tapered inner races and providing both positive retention for handling and axial spacing control. This not only enables longer performance for the reasons pointed out above but it also makes for much easier handling during manufacture of the axle and later service.

In accordance with this invention, axial bearing preload setting is controlled at the point of manufacture of the bearing assembly. Thus bearing set-up by the end user to achieve a proper preload setting is eliminated. Furthermore, an optimized pinion shaft bearing stress distribution is achieved through an improved housing support which does not require lubricant passageways, and seals isolate the internal components of the pinion shaft bearings from axle generated contaminants. The resulting lubricated and preloaded pinion shaft bearing assembly also provides a simplified installation procedure for the end user, and is simple, stable, rugged, durable, reliable, quick and easy to use and assemble, and of relatively simple design and economical manufacture.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
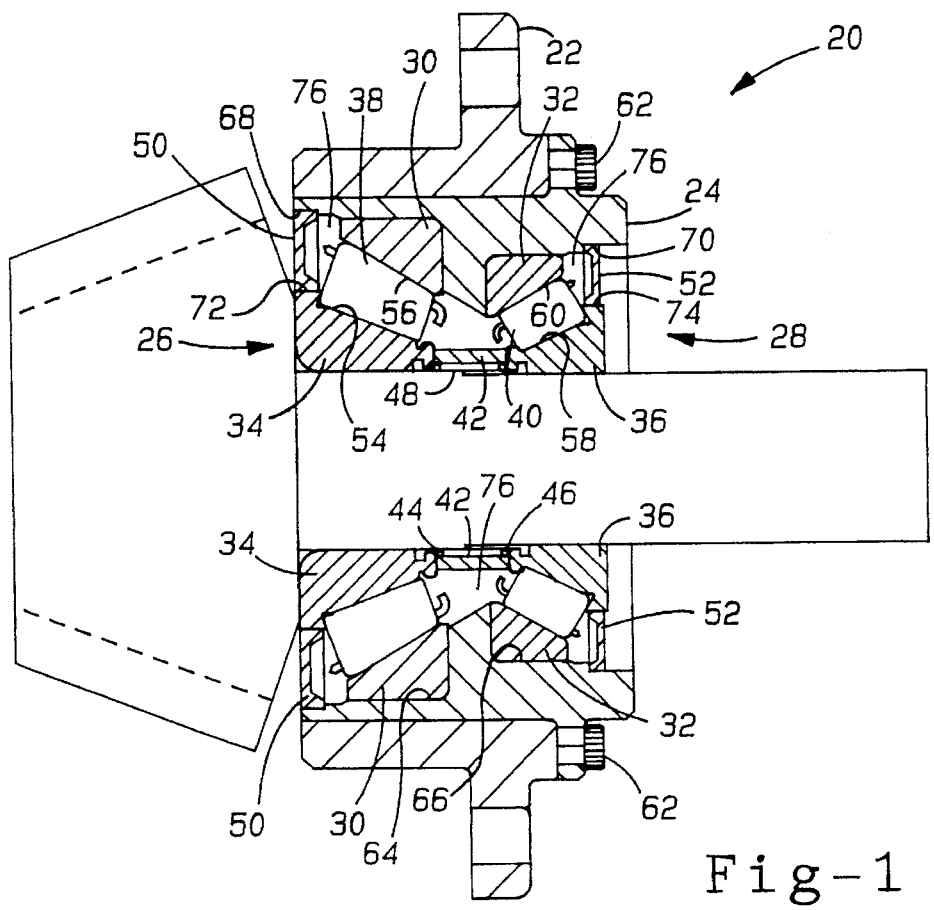
FIG. 1 is a longitudinal sectional view of a pinion shaft fitted with a cartridge pinion bearing assembly embodying this invention.
Figure 2:
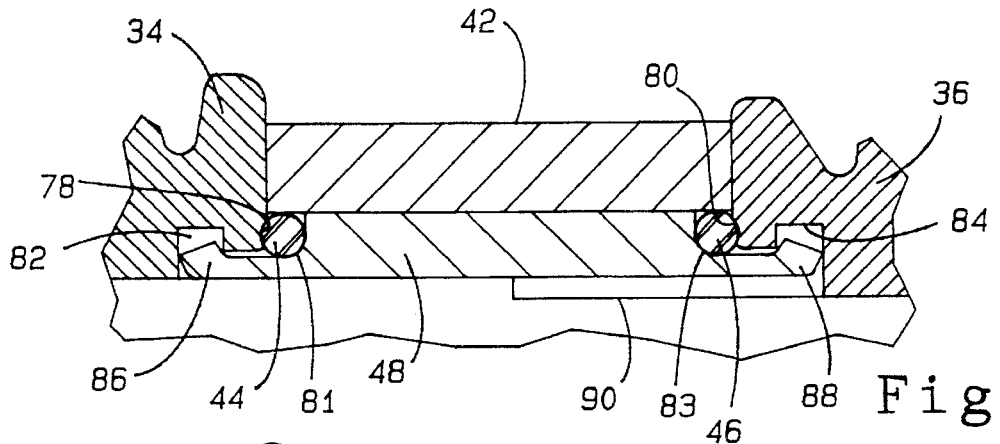
FIG. 2 is a fragmentary, but enlarged, sectional view of the bearing assembly in the region of its inner races and spacer.
Figure 3:
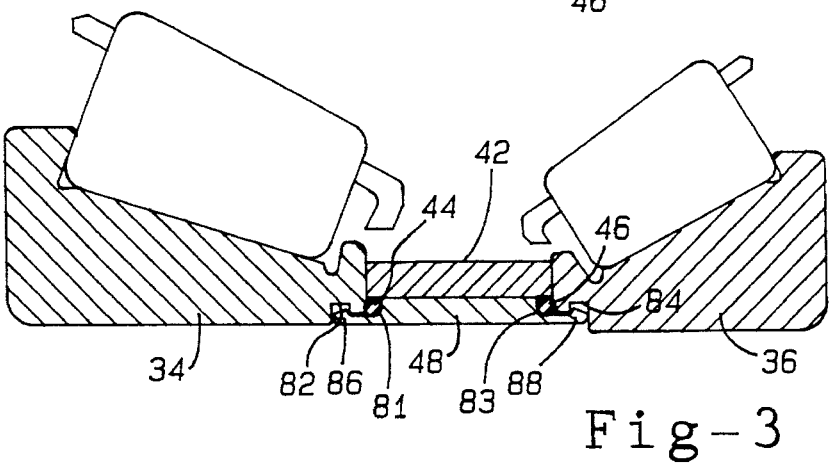
FIG. 3 is an enlarged sectional view of the bearing inner race and spacer portions of FIGS. 1 and 2.

Referring in more detail to the drawings, FIG. 1 illustrates a cartridge axle pinion bearing assembly 20 embodying this invention with a two-piece housing 22 and 24, and a pair of anti-friction bearings 26 and 28 contained within the housing. Each bearing has an outer race 30 and 32, respectively, an inner race 34 and 36, respectively, and a plurality of circumferentially spaced apart rolling elements, or rollers, 38 and 40, respectively. As further depicted in FIGS. 2 and 3, preload spacer 42 is provided between the pair of inner races to maintain desired system preload. O-ring seals 44 and 46 are provided adjacent a respective race and the adjoining spacer to seal each race with the spacer, respectively. A circumferential lock clip 48 is disposed radially inward of the spacer to carry each O-ring in sealed engagement with each inner race and spacer as well as to retain the races, spacer and seals in retention therebetween. Additionally, a pair of end seals 50 and 52 are provided to completely seal the bearing and retain lubricant within the bearing as well as to keep out axle pinion lubricant which carries axle-generated contaminants.

Preferably, the rolling elements 38 and 40 comprise a plurality of tapered rollers which mate with corresponding inner and outer races 30, 34 and 32, 36, respectively, to form inner and outer raceways 54, 56 and 58, 60, respectively. The pair of inner and outer raceways provide inclined surfaces which mate with the tapered rollers and in assembly provide for an adjustable bearing preload by sizing an appropriate spacer between the pair of inner races. The spacer regulates the size of the space between the inner and outer raceways for receiving the rollers.

Preferably, the outer housing 22 adapts the inner housing 24 so that the pinion bearing assembly, or cartridge 20, can mate with a specific manufacturer's axle carrier, and the outer housing 22 is made of cast iron. In assembly, the inner housing 24 mates with the outer housing and they are joined with fasteners 62. The inner housing is machined to accept the pair of outer races 30 and 32 within circumferential recesses 64 and 66 as well as to accept the end seals in recesses 68 and 70. Additionally, the housing is easier to manufacture and less expensive than present lubricated bearing assemblies because oil passages for delivering oil to the bearings are not needed in the housing. In the assembled state, end seals 50 and 52 are received in their respective circumferential recess 68 and 70 about an outer peripheral shelf 72 and 74 of each inner race, respectively, to provide a sealed bearing chamber 76. Lubricant is inserted into the bearing chamber just prior to installing the last end seal 52 into the bearing unit assembly. Additionally, the seals prevent axle lubricants carrying contaminants and/or chemical additives, such as extreme pressure "EP" additive, from entering the bearing and damaging the bearing or degrading the lubricating seals. In contrast, O-ring seals 44 and 46 function principally to seal lubricant within the bearing chamber 76, both before and during mounting.

Preferably, preload spacer 42 is formed by machining a steel cylindrical sleeve at one end to obtain a cylindrical spacer having a desired width. A desired pinion bearing preload is obtained in an assembled bearing by using a special gage to measure the spaced apart width between inner races that imparts a desired preload between each inner race, rollers and outer race. The gage is used to measure the space between the inner races of an assembled bearing which lacks a spacer while the inner races are forced together by a load machine which imparts a desired preload. The manufacturer then selects a spacer with a corresponding width and assembles the bearing to achieve the desired preload. While in an assembled state prior to use, the bearing will be held in sealed engagement by the coacting of the lock clip 48, O-ring seals 44 and 46, and spacer 42. Upon mounting the bearing on a pinion shaft, inner race 34 is engaged with a collar or flange and inner race 36 is axially loaded toward race 34 by press mounting a collar against race 36 such that spacer 42 pre-defines and limits the obtained preload in the assembled and mounted bearing assembly 20.

According to the invention, lock clip 48 made from a resilient material such as nylon plastic positions and clamps the spacer between the pair of inner races, and retains and seats the pair of O-ring seals 44 and 46 between the spacer and an inner circumferential face 78 and 80 on each inner race. Principally, lock clip 48 retains the O-ring seals in sealing engagement with each respective inner race while the bearing is assembled and sealed, but prior to mounting and loading the bearing assembly on a machine shaft. Additionally, lock clip 48 assists in biasing each O-ring with each inner race while the bearing assembly is mounted to a shaft in a loaded condition. Engagement of the O-ring seals between the races and spacer seals the entire inner race portion of the bearing assembly and facilitates lubrication of the assembly prior to and during final assembly.

To facilitate assembly, a pair of inner circumferential grooves 82 and 84 are provided in each inner race 34 and 36, respectively, for receiving a corresponding circumferential lip 86 and 88, respectively, formed at either end of the clip. The pair of lips and grooves cooperate to hold the pair of inner races and spacer together. Pinion shaft step down 90 forms a smaller diameter surface for mounting race 36 than the mounting surface for race 34. This prevents inadvertent backward assembly of the inner races on a pinion shaft. Typically, the inner bearings 38 must carry more load and are larger than the outer bearings 40. While spacer 42 is seated on race 36, clip 48 is circumferentially received about the spacer and lip 88 is engaged with groove 84. Then race 34 is pressed into engagement with the spacer which forcibly and frictionally engages lip 86 into groove 82. Concurrent with the preceding assembly, O-ring seals 44 and 46 are retained in sealing engagement within the resulting inner race subassembly. In this subassembly, the clip keeps the unit assembled and sealed prior to final bearing installation. Likewise, upon complete assembly of the bearing, the clip retains the inner race together and functions to seal the respective bearing components prior to final installation of the cartridge bearing assembly.

During manufacture, a bearing assembly 20 without a spacer 42 is assembled on a load machine where it is loaded to a desired preload in order to measure the resulting spaced apart gap formed between the inner races as discussed supra. Color coded spacers 42 are provided in bins such that spacers having common predetermined axial dimensions are commonly color coded, for example, with green, red, or blue, allowing easy identification of a desired spacer which achieves a desired preload in a particular bearing assembly. Once a bearing has been preloaded on a load machine and its desired spacer dimensions have been determined, an individual assembling a measured bearing can quickly and easily obtain a color coded spacer having the desired dimension such that the appropriate spacer for obtaining a desired preload in mounted assembly is then assembled within the bearing assembly.

In actual use, a cartridge axle bearing assembly 20 of this invention which is prelubricated and sealed with a properly sized spacer 42 is assembled onto a pinion shaft where inner race 34 is trapped against the back face of a pinion gear, as depicted in FIG. 1. A yoke (not shown) is then received over the pinion shaft such that it abuts with inner race 36 wherein a nut is received on the pinion shaft which allows retention and axial compression of the yoke against the inner race such that the desired load can be imparted between the inner races and spacer 42 in order to obtain the resulting bearing preload. Typically, such a yoke forms a first portion of a universal joint which connects with a vehicle's intermediate drive shaft (not shown).

Figure 4:
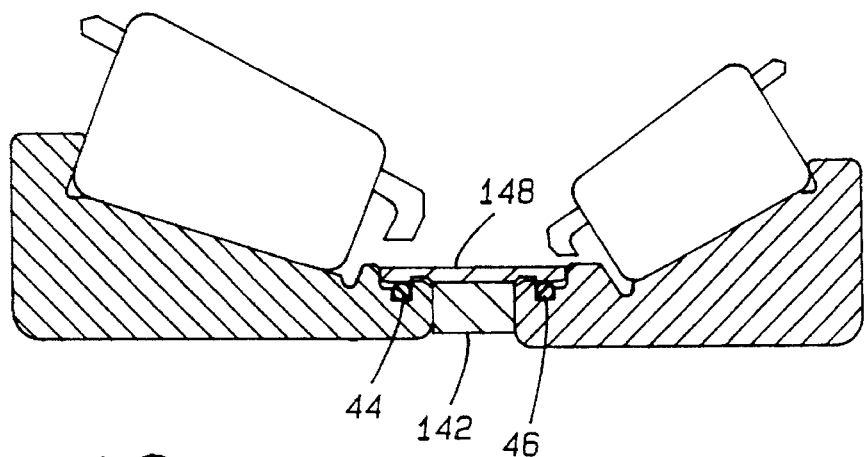
FIGS. 4–13 are enlarged sectional views of bearing inner race and spacer portions corresponding with the view of FIG. 3 and depicting alternative configurations for the bearing inner races, spacers and seals.

Various alternative constructions for providing a sealed and spaced apart connection between the pair of inner races 34 and 36 of the invention are depicted in FIGS. 4–13. FIG. 4 depicts a pair of inner races joined with a lock clip 148 and spaced apart by spacer 142 carried on the inner periphery of the clip.

Figure 5:
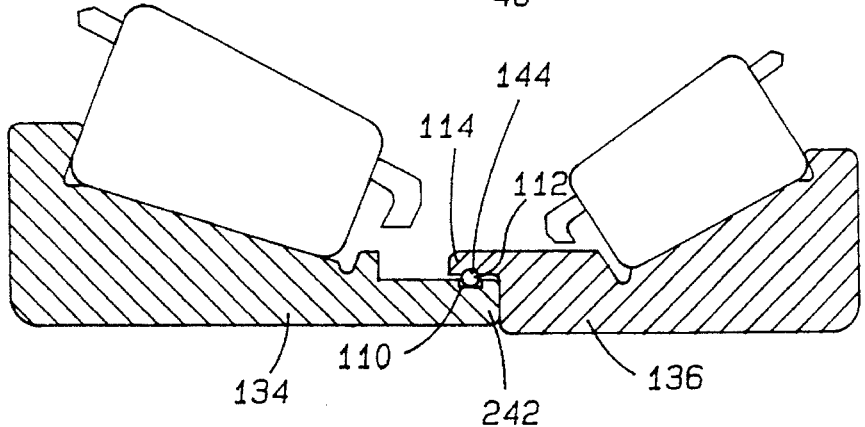
Figure 6:
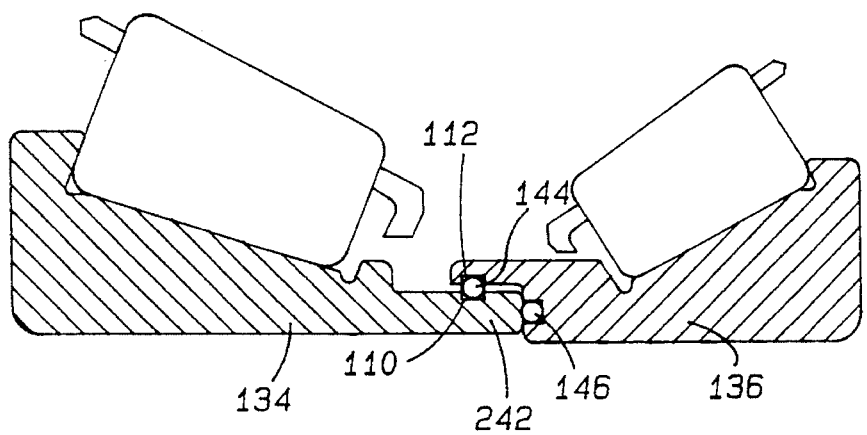
Figure 7:
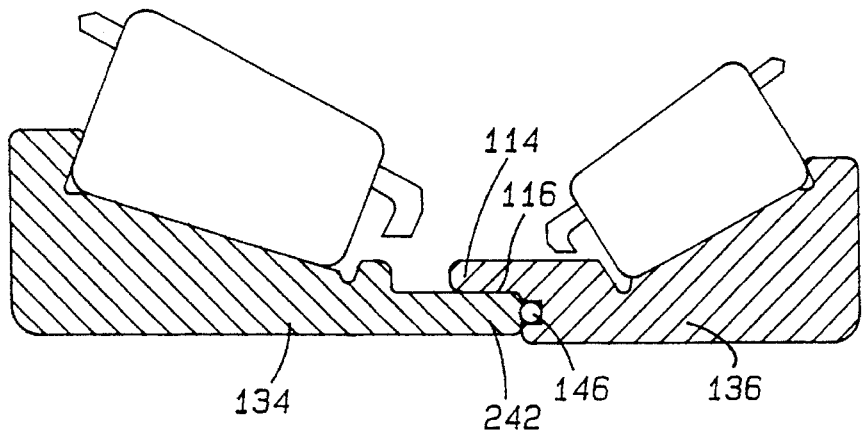

FIGS. 5–7 depict various embodiments incorporating an integral spacer 242 on one of the races 134, where the end of spacer 242 is machined to achieve the desired bearing preload. In FIG. 5, an O-ring seal 144 is circumferentially trapped between a pair of opposed outer and inner circumferential grooves 110 and 112 formed in the pair of races 134 and 136, respectively. First, seal 144 is seated in groove 110, and then raceway 136 is forcibly engaged in abutment with spacer 242 which further forcibly engages a circumferential inner shoulder 114 on race 136 over the seal to lock the pair of races together by trapping the seal between the grooves. Likewise, a similar arrangement of grooves 110 and 112 are provided in the FIG. 6 embodiment. However, an additional seal 146 is provided along the end of spacer 242 in race 136 to form a primary seal between the pair of races. In this case, seal 144 functions as both a secondary seal and a captured ring which retains the pair of races together. Alternatively, O-ring 144 can be constructed of either rigid or resilient material for the single purpose of clip engaging the pair of races together through coaction with recesses 110 and 112. Finally, the FIG. 7 embodiment utilizes a single primary seal 146 adjacent integral spacer 242, where the pair of races are retained together by sizing circumferential sleeve portion 114 to achieve a press-fit against outer surface 116 of spacer 242.

Figure 8:
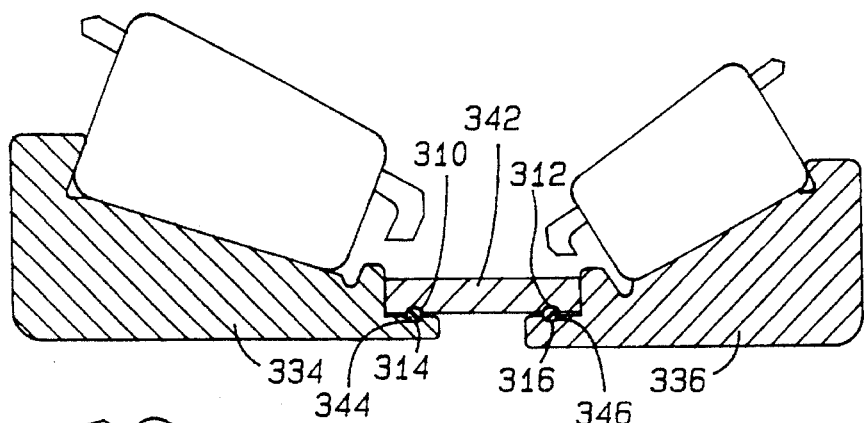
Figure 9:
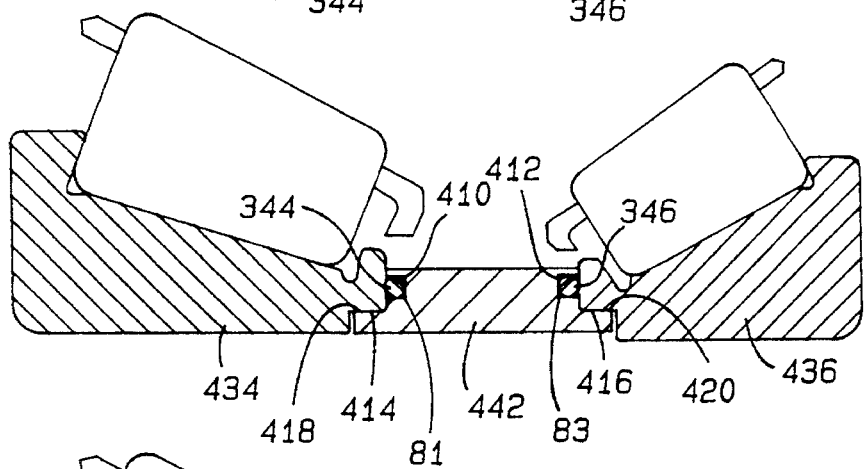

FIGS. 8 and 9 depict various embodiments which eliminate the nylon lock clip 48 and utilize a modified preload spacer 342 and 442 to clamp the pair of inner races 334, 336, 434 and 436 together, respectively. In the FIG. 8 embodiment, circumferential grooves 310 and 312 are formed in the spacer at each end which mate with radially opposed complementary grooves 314 and 316 formed in each inner race 334 and 336, respectively. A seal is provided at each end of the spacer by circumferentially trapping an O-ring seal 344 and 346 between the grooves 310, 314 and 312, 316, respectively. To assemble and seal the pair of inner races together, seals 344 and 346 are first inserted into grooves 314 and 316, then the spacer is positioned between the races as they are press-fit together, engaging grooves 310 and 312 with seals 344 and 346 as the ends of the spacer seat in abutment with each inner race, respectively. In the FIG. 9 embodiment, the spacer 442 has a pair of circumferential end grooves 410 and 412 which receive O-ring seals 344 and 346 therein, respectively. A circumferential outer shoulder 414 and 416 is formed at either end of the spacer. In assembly, each shoulder engages frictionally with a corresponding inner shoulder 418, 420 on each race 434 and 436, respectively, to retain the pair of inner races together. As the inner races are press-fit to the spacer, O-ring seals 344 and 346 engage and seal between each race and the spacer, respectively.

Figure 10:
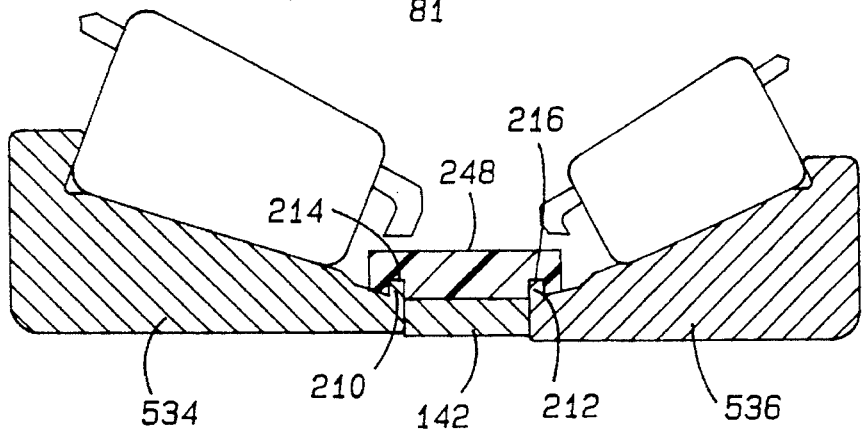
Figure 11:
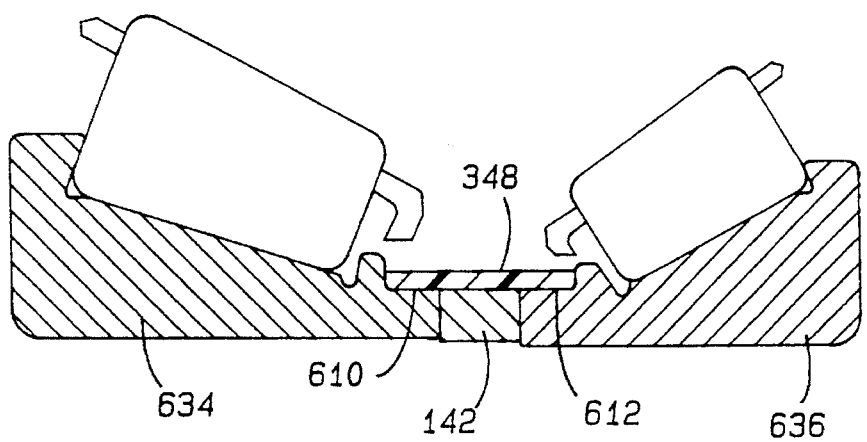
Figure 12:
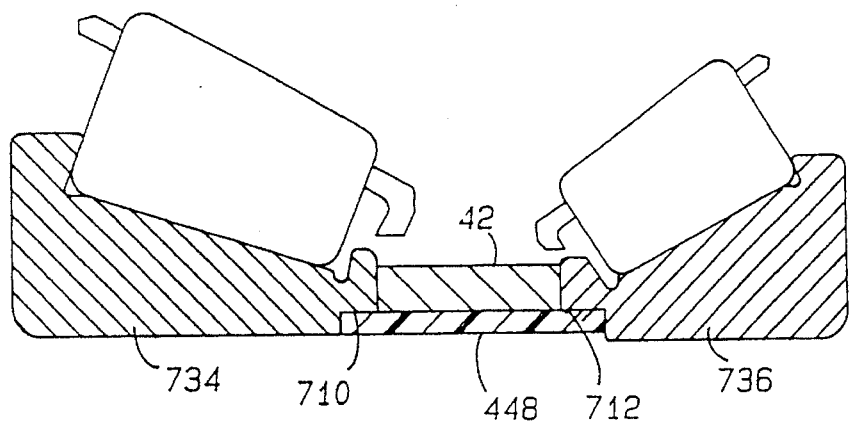
Figure 13:
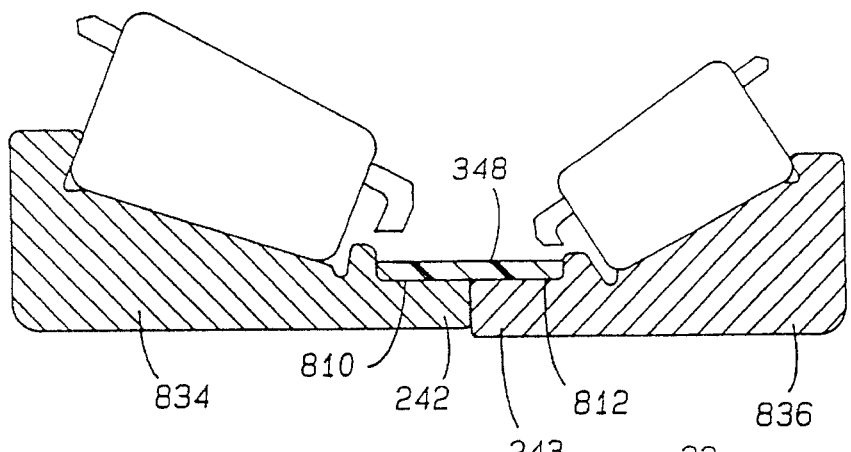

In FIGS. 10–13, various alternative embodiments are depicted which eliminate the O-ring seals and provide integral sealing surfaces on the lock clip and/or the spacer for sealing with each inner race. In FIG. 10, a resilient cylindrical lock clip 248 is received radially outwardly of an inner spacer 142. Circumferential and radially outwardly biased lips 210 and 212 are formed by each inner race 534 and 536, respectively. Corresponding mating circumferential grooves 214 and 216 are formed at either end of the clip 248, respectively, which resiliently engage with each circumferential lip 210 and 212, respectively, to lock the pair of inner races together. Preferably, the lock clip is constructed from a resilient material to form an integral seal with each inner race where it joins with each circumferential lip at either end. Spacer 142 is trapped between the pair of races to space them apart while the clip is applied circumferentially about the spacer and into each race. In the FIG. 11 embodiment, lock clip 348 is received circumferentially outwardly of the inner spacer and is sized to frictionally engage through a press-fit with circumferential outer grooves 610 and 612 of each race 634 and 636, respectively. Spacer 142 is inserted inside clip 348 and one end of the clip is frictionally and forcibly inserted into groove 612 of race 636. Then race 634 is frictionally and enforceably engaged over the opposite end of clip 348 along recess 610 until spacer 142 engages in abutment between the pair of races. In FIG. 12, spacer 42 is circumferentially carried outside clip 448 which is press-fit to frictionally engage with the pair of races 734 and 736 at either end with grooves 710 and 712, respectively. Finally, FIG. 13 depicts a pair of races 834 and 836 spaced apart by a pair of opposed integral spacers 242 and 243 formed on inner races 834 and 836, respectively, which are joined together and sealed by a resilient lock clip 348 press-fit onto outer circumferential grooves 810 and 812 formed in the inner races, respectively. Preferably, lock clip 348 is formed from a resilient material and is sized to forcibly and frictionally engage with the pair of grooves and form an integral seal therebetween.

Figure 14:
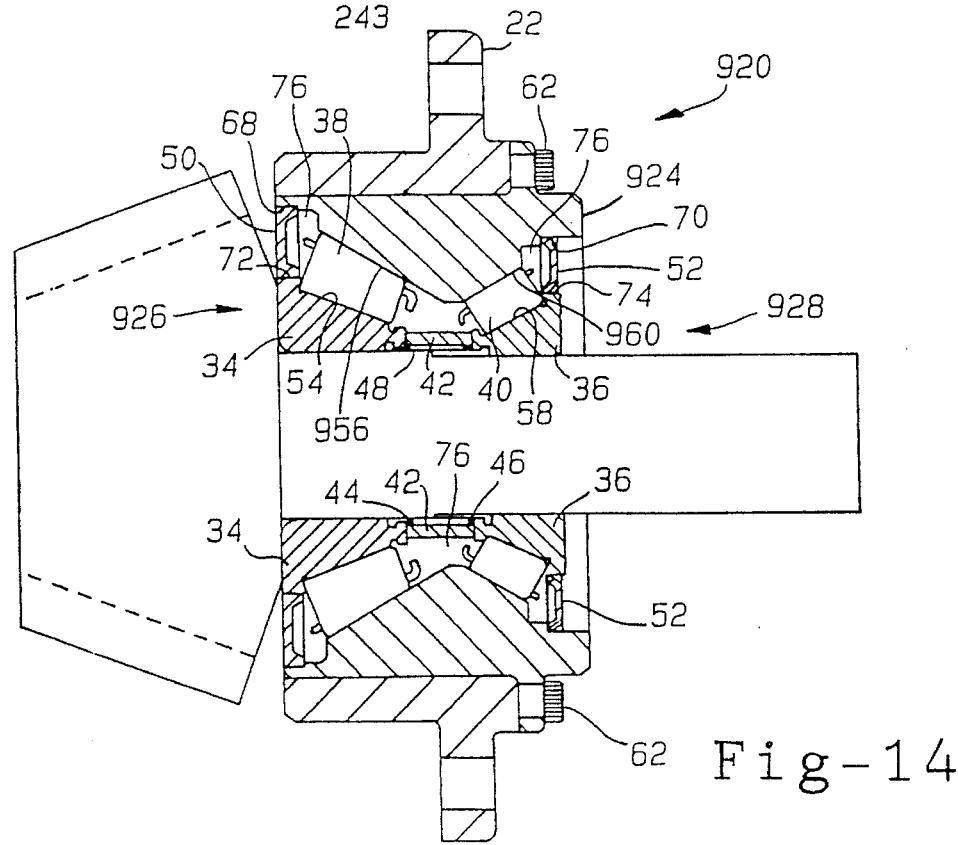
FIG. 14 is a longitudinal sectional view of a pinion shaft fitted with a cartridge pinion bearing assembly embodying an alternative configuration for the bearing outer races and pinion housing.

FIG. 14 depicts a variation to the FIG. 1 embodiment wherein the inner housing 24 of FIG. 1 is replaced by a one-piece inner race 924 which supports a pair of bearings 926 and 928 to form a cartridge axle pinion bearing assembly 920. A pair of outer raceways 956 and 960 are likewise defined in the outer race 924. Preferably, outer race 924 is retained in housing 22 with fasteners 62. Further features present in the FIG. 14 embodiment are common to those shown in FIG. 1 and are described in the description accompanying FIG. 1.

Laboratory testing has proven the reliability of the cone bore seal concept, namely the seal formed between the inner races 34 and 36 by O-ring seals 44 and 46. An alcohol filled system was found to remain leak free for 48+ hours. Test machine operation at high loads and application type sealing was found to meet qualification test requirements, 700+ hours, as specified by one large axle manufacturer.

The cartridge axle pinion bearing assembly of this invention is used to provide a sealed unitary bearing device which can be preassembled and packaged in a factory and filled with oil prior to final installation by an end user while providing for desired preload within the bearing during the assembly operation by sizing a spacer between the pair of races. Pinion bearing stress distribution can be improved by eliminating oil passages in the housing. An optimal lubricant can be utilized within the sealed bearing arrangement which further isolates the pinion bearings from contaminants such as axle generated debris. Likewise, a bearing manufacturer can provide for optimized axial preload settings in a fully assembled and sealed bearing which eliminates the need for an end user to set up the bearings to ensure proper preload. Likewise, the invention provides a simplified installation procedure for an end user which provides a housing of more uniform support for pinion bearings and more optimized distribution of stresses around the entire raceway surface which can be optimized by tailoring a housing shape and profile, which can also reduce the affects of misalignment on bearing performance, and which provides enhanced lubrication and resistance to contamination, thus extending bearing life.

It is to be understood that the invention is not limited to the exact construction illustrated and described above, but that various changes and modifications may be made without departing from the spirit and scope of the invention as defined in the following claims.

I claim:

1. A cartridge bearing assembly of a gear reduction system providing rotating shaft support between a pinion shaft and a pinion housing comprising:

a pair of anti-friction bearings each having an outer race and an inner race respectively defining outer and inner raceways, and also having a plurality of circumferentially spaced apart rolling elements which roll along said raceways;

spacer means provided between said inner races for spacing said inner races apart;

retention means provided generally between said inner races for maintaining said inner races together;

at least one race seal formed between said inner races to circumferentially seal said inner races and retain lubricating oil in said bearing assembly; and a pair of end seals each carried at outboard ends of said inner and outer raceways between said inner and outer races forming barriers at opposing ends of said bearing assembly to retain lubricating oil within said bearing assembly and seal out lubricant present within said gear reduction system.

2. The bearing assembly of claim 1 wherein said spacer means is a spacer formed from a separate circumferential body disposed between said pair of inner races.

3. The bearing assembly of claim 2 wherein said retention means is comprised of a cylindrical body separate from said spacer means.

4. The bearing assembly of claim 3 wherein said retention means is press fit into engagement with at least one of said inner races.

5. The bearing assembly of claim 1 wherein said at least one of said inner races integrally forms said spacer means.

6. The bearing assembly of claim 5 wherein at least one of said inner races defines a seal groove for retaining said race seal.

7. The bearing assembly of claim 5 wherein said inner races are press fit together.

8. The bearing assembly of claim 5 wherein said race seal is disposed on radial faces of said inner races.

9. The bearing assembly of claim 5 wherein said race seal is disposed on cylindrical faces of said inner races.

10. The bearing assembly of claim 5 further comprising a retainer which is press fit into engagement with at least one of said inner races.

11. The bearing assembly of claim 1 wherein said outer races of each of said bearings are separate elements.

12. The bearing assembly of claim 1 wherein said outer races of each of said bearings are integral.

13. The bearing assembly as set forth in claim 1 wherein said race seal adjoins said spacer means.

14. The bearing assembly as set forth in claim 1 wherein said race seal engages only said inner race and said retention means to circumferentially seal said inner races.

15. The bearing assembly as set forth in claim 1 wherein said race seal engages only said inner race and said retention means, said retention means being comprised of a cylindrical body separate from said spacer means and disposed radially outward of said spacer means.

16. The bearing assembly as set forth in claim 1 wherein said race seal is received within a circumferential groove formed in said retention means.

17. A cartridge bearing assembly of a gear reduction system providing rotating shaft support between a pinion shaft and a pinion housing comprising:

a pair of anti-friction bearings each having an outer race and an inner circumferentially spaced apart rolling elements which roll along said raceways;

retention means for maintaining said inner races together;

spacer means provided between said inner races for spacing said inner races apart, said spacer means including a spacer formed from a separate circumferential body, said spacer further acting as said retention means;

at least one race seal formed between said inner races and adjoining said spacer means to circumferentially seal said inner races and retain lubricating oil in said bearing assembly; and a pair of end seals each carried at outboard ends of said inner and outer raceways between said inner and outer races forming barriers at opposing ends of said bearing assembly to retain lubricating oil within said bearing assembly and seal out lubricant present within said gear reduction system.

18. The bearing assembly of claim 17 wherein said spacer defines a seal groove and at least one of said inner races defining a seal groove which cooperate to trap said race seal therein.

19. The bearing assembly of claim 17 wherein said spacer is press fit into engagement with at least one of said inner races.

20. A cartridge bearing assembly of a gear reduction system providing rotating shaft support between a pinion shaft and a pinion housing comprising:

a pair of anti-friction bearings, each having an outer race and an inner race respectively defining outer and inner raceways, and also having a plurality of circumferentially spaced apart rolling elements which roll along said raceways;

spacer means provided between said inner races for spacing said inner races apart, said spacer means including a spacer formed from a separate circumferential body;

retention means for maintaining said inner races together, said retention means further comprised of a cylindrical body separate from said spacer means, said cylindrical body disposed radially outside said spacer;

at least one race seal formed between said inner races and adjoining said spacer means to circumferentially seal said inner races and retain lubricating oil in said bearing assembly; and a pair of end seals each carried at outboard ends of said inner and outer raceways between said inner and outer races forming barriers at opposing ends of said bearing assembly to retain lubricating oil within said bearing assembly and seal out lubricant present within said gear reduction system.

21. A cartridge bearing assembly of a gear reduction system providing rotating shaft support between a pinion shaft and a pinion housing comprising:

a pair of anti-friction bearings each having an outer race and an inner race respectively defining outer and inner raceways, and also having a plurality of circumferentially spaced apart rolling elements which roll along said raceways;

spacer means provided between said inner races for spacing said inner races apart, said spacer means including a spacer formed from a separate circumferential body;

retention means for maintaining said inner races together, said retention means further comprised of a cylindrical body separate from said spacer means, said retention means further composed of a cylindrical body separate from said spacer means, said cylindrical body disposed radially inside said spacer;

at least one race seal formed between said inner races and adjoining said spacer means to circumferentially seal said inner races and retain lubricating oil in said bearing assembly; and a pair of end seals each carried at outboard ends of said inner and outer raceways between said inner and outer races forming barriers at opposing ends of said bearing assembly to retain lubricating oil within said bearing assembly and seal out lubricant present within said gear reduction system.

22. A cartridge bearing assembly of a gear reduction system providing rotating shaft support between a pinion shaft and a pinion housing comprising:

a pair of anti-friction bearings each having an outer race and an inner race respectively defining outer and inner raceways, and also having a plurality of circumferentially spaced apart rolling elements which roll along said raceways;

spacer means provided between said inner races for spacing said inner races apart, said spacer means including a spacer formed from a separate circumferential body;

retention means for maintaining said inner races together, said retention means further comprised of a cylindrical body separate from said spacer means, said cylindrical body including clip means for snap engagement with at least one of said inner races;

at least one race seal formed between said inner races and adjoining said spacer means to circumferentially seal said inner races and retain lubricating oil in said bearing assembly; and a pair of end seals each carried at outboard ends of said inner and outer raceways between said inner and outer races forming barriers at opposing ends of said bearing assembly to retain lubricating oil within said bearing assembly and seal out lubricant present within said clear reduction system.

23. The bearing assembly of claim 22 wherein said clip means engages an inner groove formed by at least one of said inner races.

24. The bearing assembly of claim 22 wherein said clip means engages an outer groove formed by at least one of said inner races.

25. The bearing assembly of claim 22 wherein said clip means defines at least a portion of a circumferential groove for retaining said race seal.

26. The bearing assembly of claim 22 wherein said clip means further defines said race seal.

* * * * *